Figure 1:
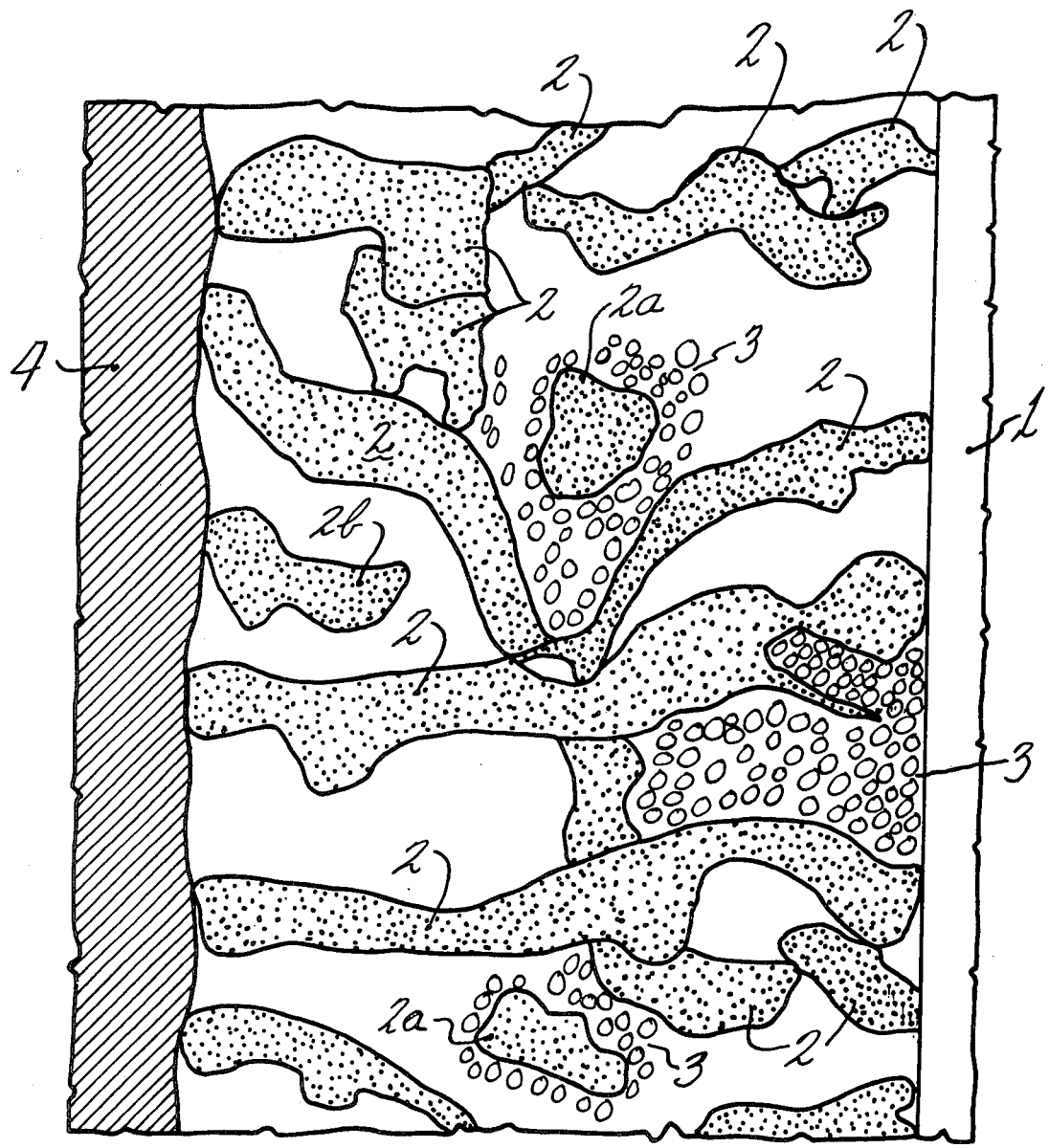

United States Patent [19]

Katz et al.

[11] 4,078,119
[45] Mar. 7, 1978

[54] METHOD FOR CATALYZING A FUEL CELL ELECTRODE AND AN ELECTRODE SO PRODUCED

[75] Inventors: Murray Katz, Newington; Arthur Kaufman, Bloomfield, both of Conn.

[73] Assignee: United Technologies Corporation, East Hartford, Conn.

[21] Appl. No.: 686,780

[22] Filed: May 17, 1976

Related U.S. Application Data

[62] Division of Ser. No. 533,918, Dec. 18, 1974, Pat. No. 3,932,197, which is a division of Ser. No. 645,692, Jan. 2, 1976, Pat. No. 3,979,227.

[51] Int. Cl.$^2$ ............................................. H01M 4/04
[52] U.S. Cl. ...................................................... 429/13
[58] Field of Search ........................... 429/42, 44, 12, 13

[56] References Cited

U.S. PATENT DOCUMENTS 3,676,222  7/1972  Deibert ................................. 429/42

*Primary Examiner*—John H. Mack
*Assistant Examiner*—H. A. Feeley
*Attorney, Agent, or Firm*—Steven F. Stone

[57] ABSTRACT

A porous conducting particle, hydrophobic bonded, substrate supported electrode is prewetted with the electrolyte. A D.C. voltage is applied to the electrode to assist in the prewetting with the electrolyte. A soluble catalyst-containing material is then introduced into the electrode structure and the catalyst deposited within the electrode. By appropriate selection of the porous conducting particles and the catalyst-applying techniques, precise control of the location of the catalyst can be obtained. If graphite materials are used as the conducting particles, a catalyst-containing salt is allowed to dissolve in the electrolyte in the prewetted electrode, and the catalyst-containing material is reduced to the metal. If the reduction is done by reaction with a reducing gas such as hydrogen, the catalyst will be deposited only in those regions of the electrode at which there is an electrolyte-reactant gas interface which is in electrical-conducting relationship with the substrate. Alternatively, extremely precise amounts of catalyst can be deposited within the electrode structure by use of a solution of a compound of the catalyst whose wettability with the hydrophobic material varies as the solution evaporates. By this technique almost 100% of the catalyst can be deposited within the electrode structure on the hydrophilic region, with virtually no losses in the hydrophobic material.

10 Claims, 2 Drawing Figures

FIG_1

METHOD FOR CATALYZING A FUEL CELL ELECTRODE AND AN ELECTRODE SO PRODUCED

This is a division, of application Ser. No. 645,962, filed Jan. 2, 1976, now U.S. Pat. No. 3,979,227 which was a division of Ser. No. 533,918, filed Dec. 18, 1974, now U.S. Pat. No. 3,932,197, issued Jan. 13, 1976.

BACKGROUND OF THE INVENTION

1. Field of the Invention

This invention relates to electrochemical cells and more particularly, to a method of catalyzing electrochemical cell electrodes and the electrodes so produced.

2. Description of the Prior Art

A well-known and important type of electrochemical cell is a fuel cell which reacts a fuel and an oxidant at a pair of electrodes to make electricity. Low temperature fuel cells require catalysts in each of the electrodes to promote the reaction of the fuel and the oxidant. But, the electrochemical reaction of each of the reactant gases takes place in the presence of the catalyst only in those regions of an electrode in which the electrolyte and the reaction gas establish an interface and the electricity produced can be taken away. If there is catalyst at other places in the fuel cell electrode, or if catalyst is lost in processing, that catalyst is wasted. Catalysts typically used in fuel cells are expensive noble metals and therefore it is desirable to reduce the waste as much as possible and still have good fuel cell performance; that is, efficient utilization of the catalyst is essential. To achieve an electrode in an electrochemical cell that can provide a high current density and maintain a high voltage, it is necessary to have a large electrolyte/reactant gas interface area. It is known in the prior art that use of small and distinct hydrophobic areas through which the reactant gas can pass and hydrophilic areas in which the electrolyte can be present, allows for large interfaces. In one type of electrode having these characteristics which has found wide acceptance, catalyzed agglomerates of porous carbon particles are bound together with polytetrafluoroethylene (PTFE) to establish the hydrophobic and hydrophilic areas. One known method for catalyzing such electrodes applies a catalyst to the carbon particles before the carbon particles are bound together with the PTFE and put onto a current collector support to form an electrode: this is known as pre-catalyzation. The pre-catalyzation method deposits catalyst on all of the carbon particles that are to be used in the electrode and, as a result, some of the catalyst is wasted because some of it is placed where there may be no electrolyte/reactant gas interface or where there is no electrical path out of the cell. The precatalytic techniques also involve losses in the original treatment of the carbon as well as in the handling of the catalyzed carbon during fabrication of the electrode.

In addition, it has sometimes been observed that pre-catalyzed electrodes do not function as efficiently as electrodes which are fabricated according to "post-catalyzation techniques." A post-catalyzation technique is one in which the catalyst is deposited in the electrode structure after the electrode structure has been formed. Although resulting in superior performing electrodes all post-catalyzation techniques hitherto employed have been extremely difficult processes to control. This results in a substantial amount of the catalyst being deposited in areas where it is not desired. According to this invention, we have found a method by which post-catalyzation of conducting particle, hydrophobic bonded substrate supported electrodes can be obtained by simple and extremely controllable techniques.

It is, accordingly, an object of this invention to provide an efficiently catalyzed electrochemical cell electrode.

Another object of the present invention is to provide a method for post-catalyzing an eletrochemical cell electrode.

It is another object of this invention to provide a method for pre-wetting, with an electrolyte, an electrochemical cell electrode.

It is another object of this invention to provide methods for selectively depositing a catalyst in a prewetted electrochemical cell electrode.

Figure 2:
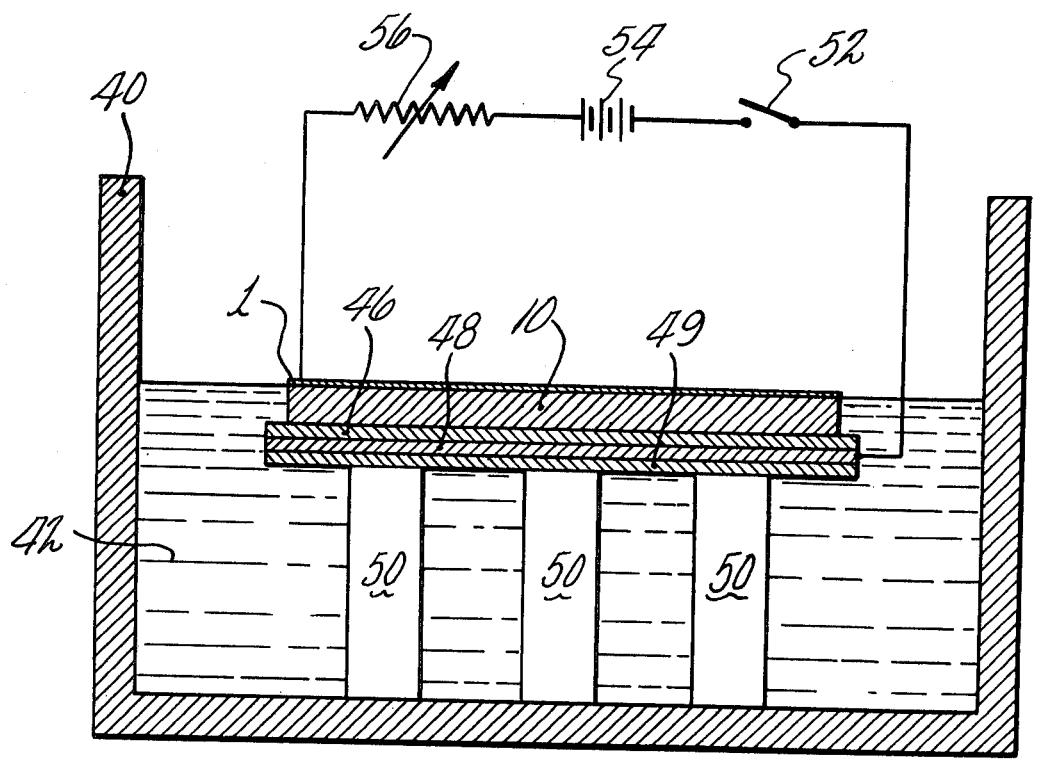

These and other objects of the invention will be readily apparent from the following description with reference to the accompanying drawings wherein:

FIG. 1 is a schematic section through a conducting particle hydrophobically bonded substrate supported electrochemical cell electrode and FIG. 2 is a cross-section view of apparatus for carrying out the prewetting step of this invention.

DESCRIPTION OF THE INVENTION

Referring now to the drawings, FIG. 1 represents a schematic cross-sectional view through a typical, porous conducting particle, hydrophobic bonded substrate supported electrode. Such an electrode consists of a substrate 1 formed from a gas-permeable corrosion-resistant electrical conductor, which in the conventional phosphoric acid electrolyte fuel cell is a thin paper formed from graphite or carbon fibers, hereinafter referred to as carbon paper. The carbon paper substrate 1 may also be coated with a thin layer of hydrophobic material such as PTFE to render it resistant to flooding with the electrolyte which would destroy the gas permeability of the substrate 1 but this coating of hydrophobic material must be sufficiently thin as not to interfere with the electrical conducting capacity of the substrate 1. The body of the electrode consists of porous electrically conductive particles 2 having catalyst deposited on the surface. It should be recognized that the particles 2 are in actuality agglomerates of smaller porous particles. However, the detailed structure of these particles is not important to an understanding of the invention and has been omitted from the drawing for clarity. The particles 2 are bonded together by hydrophobic corrosion-resistant microspheres 3. It will be understood that the microspheres 3 fill substantially the entire volume between the particles 2 between the electrolyte matrix 4 and the substrate 1, whereas in the drawing they are only shown in certain locations, being omitted from the remainder of the drawing for purposes of clarity. The conducting particles 2 formed of a corrosion-resistant electrical conductor must be wetted by the electrolyte which is stored in matrix 4. Suitable materials for the particles being carbon black (e.g., Cabot Vulcan XC 72) or graphitized carbon black. The preferred hydrophobic material is polytetrafluoroethylene (PTFE). The face of the electrode opposite the substrate 1 abuts against a fibrous matrix 4 which is filled with the fluid electrolyte which, in the case of a phosphoric acid fuel cell would be concentrated phosphoric acid. In operation of such a fuel cell, the fuel or oxidant gas would be caused to flow past the substrate 1, diffusing into this electrode through the spaces maintained by the hydrophobic microspheres 3; the hydrophobic nature of the microsphere preventing the electrolyte from entering into these gas-flow channels. The electrolyte from the matrix 4 flows through the pores and across the surface of the conducting particles 2. At those places on the surface of the conducting particles 2 where there is an interface between the electrolyte covering the catalyst and the reactant gas, a chemical reaction (either oxidation or reduction depending upon whether the electrode is an anode or a cathode, respectively) occurs. The electron transfer with the external circuit occurs across current conducting paths between the conducting particles 2 and the substrate 1 and the ion transfer occurs by diffusion between the electrolyte matrix 4 and the electrolyte on the particles 2.

As can be seen from FIG. 1, certain of the conducting particles which are designated as 2a surrounded by the hydrophobic material 3 and as such are insulated from the current collecting substrate 1. Since these particles are electrically insulated from the substrate, no electron transfer to or from these surfaces can occur. Thus, no chemical reaction can take place on the particle and any catalyst which is deposited on these particles will be wasted. According to one embodiment of our invention, this aspect of catalyst waste can be avoided. According to other embodiments of our invention, deposition of catalyst on particles 2 is permitted to occur. However, the overall post-catalyzation process is carried out in a simple and economical manner without external wasting of any catalyst or the need to recover catalyst from the processing step.

According to our invention, the electrode is prewetted with the electrolyte and then a soluble catalyst-containing material is caused to enter into solution with the electrolyte on the surfaces of the particles 2 which have been wet by the electrolyte. A chemical reaction is then caused to occur which deposits the catalyst on the surface of these particles. Thus, in order to successfully accomplish the post-catalyzing process of our invention, it is necessary to solve two problems: 1) how to prewet the electrode with the electrolyte and 2) how to deposit the catalyst on the surfaces of the prewetted particles 2.

In order to prewet the electrode, it is necessary to cause the electrolyte to completely cover and penetrate through the porous conducting particles 2. When the conducting particles 2 were made of carbon black, it was possible to obtain prewetting by simple wicking action which occurs when the electrode is placed in contact with the electrolyte matrix. Since carbon black is reasonably wettable by the electrolyte, electrolyte will, with time, penetrate through the pores and cover the surface of the particles 2, but a substantial period of time is required to obtain complete wetting. When the conducting particles 2 are made of graphitized carbon black, wicking does not occur or occurs with extreme slowness because the surface is not readily wettable by the electrolyte. In such instances we have found that it is necessary to prewet the electrode by means of an anodic potential applied to the electrode which renders the surface of the graphitized particles wettable with electrolyte, probably by the formation of oxides of carbon on the surface at the interface between the electrolyte and the carbon. When used with graphitized carbon black, this prewetting approach causes electrolyte to wet only those particles which are in electrical-conducting relationship between the electrolyte matrix and the conducting substrate. Thus, particles such as 2a and 2b will not be wet with electrolyte since they are not in current carrying relationship to the substrate across which the potential is applied. This process of anodically wetting the electrode can also be utilized with wettable conducting particles such as those formed of carbon black and in this instance it substantially reduces the time required to complete prewetting of the electrode. In this instance, however, since the conducting particles are wettable, particle 2b would be wet by the electrolyte through simple wicking and particle 2a could conceivably become wet if a liquid passage occurred in the electrode structure as a result of some imperfection in the way it was manufactured which would permit electrolyte to reach the surface of this particle. The voltage and current required to cause the prewetting is selectable within relatively wide limits, a minimum voltage potential of approximately 0.9 volts above the hydrogen potential being required to cause the generation of some oxide at the interface between electrolyte and the carbon. In practice, a voltage in the range of 0.9 to 1.6 volts at a current density of 1 to 2 milliamperes/cm$^2$ has been found to produce satisfactory results within a reasonable period of time. Obviously, the lower the current density, the longer the reaction time, and operating below the minimum potential of approximately 0.9 volts will not produce the necessary oxide formation. Operating above 1.6 volts has not been found to materially enhance the process.

Referring to FIG. 2, the apparatus by which the electrode can be prewetted is illustrated. An uncatalyzed electrode 10 corresponding in structure to that shown in FIG. 1 is placed in a container 40 filled with the electrolyte which, in this case, is concentrated phosphoric acid 42, preferably with the conducting substrate 1 above the surface of the electrolyte 42 with the layer of conducting particles and hydrophobic particles immersed in the electrolyte. This arrangement is desirable in order to prevent the substrate 1 from becoming wet with the electrolyte which could destroy its hydrophobic character and obstruct gas flow in the subsequent operation of the fuel cell. The electrode 10 which is to be wetted by the electrolyte 42 rests upon a nonconducting porous matrix 46 such as tissue quartz which is used to electrically insulate the electrode from its counter-electrode. This matrix 46 in turn rests on a metal screen counter-electrode 48 which in this embodiment is the negative electrode and which is, in turn, supported on a porous spacer 49 which is used to permit the evolution of any gas generated at the electrode 48. The entire assembly rests on supports 50 which maintain the assembly off the bottom of container 40 and at the proper elevation within container 40. The substrate 1 of the electrode 10 to be wetted is connected via rheostat 56 to the positive terminal of a power source 54 and the counter-electrode is connected by a switch to the negative plate of power source 54. When switch 52 is closed and a proper appropriate adjustment made of rheostat 56, a positive voltage of between 0.9 and 1.6 volts can be applied across the electrode 10 which results in the evolution of some hydrogen gas at negative electrode 48 and presumably the production of some carbon oxide at the interfaces between the electrolyte and the current carrying conducting particles 2 of electrode 10. Referring now to FIG. 1, it will be seen that since graphitized particles 2a and 2b are not in electrical-conducting relationship with substrate 1, no wetting of these particles will occur, whereas particles 2 will be wet with the electrolyte. It has been found that electrode 10 is filled with the electrolyte in less than ten minutes and this time period for any particular configuration of electrode is readily determined experimentally by weighing the electrode to ascertain the amount of acid that has entered into the electrode and by performance data on the resultant electrode. Similar results are also obtained when the conducting particles 2 are formed from a wettable material such as carbon black. In this case, the particles would have been wettable with the electrolyte purely by wick action. However, as a result of the anodic potential, the treatment time is reduced from over an hour to a few minutes. In this case, however; particles such as 2b will become wet with electrolyte as a result purely of the wicking and particles such as 2a may become wet with the electrolyte in the event of some imperfection in the electrode matrix which would permit a liquid passage from the electrolyte bath to the particles 2a Having thoroughly prewet the electrode with the electrolyte via the technique described above, it now becomes necessary to deposit a suitable catalyst on the surface of the conducting particles 2. Various materials are known to the art to be usable as catalysts; however, the most highly efficient known to date is platinum. This invention will be described with respect thereto, it being recognized that corresponding treatment of other soluble compounds of catalytically active metals can be used according to our invention. According to one embodiment of our invention, a solution of soluble, catlyst-containing compound is placed in contact with the prewet electrode and the soluble catalyst containing compound is permitted to diffuse into the electrolyte contained on conducting particles 2. Thus, referring now to FIG. 1, a porous absorptive mat similar to blotting paper and resistant to acids is impregnated with a solution of chloroplatinic acid and placed in contact with the electrode in the location shown as 4 on FIG. 1. The chloroplatinic acid contained on this mat will diffuse into the electrolyte contained on particles 2 and after a period of time, which is dependent upon the concentration of chlorolplatinic acid in the mat 4 and the configuration of the electrode itself, an amount of chloroplatinic acid will have diffused substantially uniformly across all of the conducting particles 2 which have been coated by the electrolyte by the process described above. The electrode is then removed and the surface of the electrode blotted to remove the surface film of excess catalyst. The soluble catalyst containing material is then chemically modified to precipitate metallic catalyst. This can be accomplished, for example, by a chemical oxidation-reduction reaction to cause metallic platinum to be deposited on the surface of the conducting particles 2. Such as reaction can be conveniently conducted by passing hydrogen gas (preferably 120° F to 400° F) through the supporting substrate 1 causing chemical reduction of the chloroplatinic acid to deposit platinum on the surface of conducting particles 2. If the electrode structure has been formed from graphitized carbon black, anodically wetted as described above, particles 2b and 2a will not contain any electrolyte and will not have any platinum deposited thereon. In this embodiment of the invention, the platinum is deposited within the electrode structure only in those areas where a chemical reaction with appropriate electron transfer can occur, and thus the platinum within the fuel cell electrode is efficiently utilized. When carbon black is used as the conducting particle, for example, some catalyst deposition will occur on particles such as 2b.

Since the electrolyte into which the catalyst containing compound diffuses is located not only at the surface of particles 2 but also throughout the porous body of these particles; in some cases the electrode can be treated to prevent the catalyst from entering into the electrode in the pores. Such a treatment would result in the catalyst being deposited on the surface of the particles rather than within the pores. One approach taken was to freeze the electrode thereby substantially reducing the rate at which the catalyst containing material could enter the pores but without effecting the rate at which the solution would wick into the electrode structure.

When highly concentrated phosphoric acid is the electrolyte, a separate freezing step is not necessary because the phosphoric acid is a solid at room temperature in the presence of large numbers of nucleation sites such as the carbon itself. In other systems a freezing step or some other pore blocking technique could prove desirable and the use of such a step is contemplated by this invention when needed.

The diffusion procedure, although desirable from the point of view of maximum catalyst utilization, does require the recovery of the catalyst-containing material from the matrix or mat from which the catalyst-containing material was allowed to diffuse into the electrode and from the blotter used to remove the surface film. This requires an additional processing step. According to another embodiment of this invention, there is no need for any recovery step since all of the catalyst-containing material applied to the electrode is ultimately deposited within the electrode on conducting particles 2. According to this embodiment some catalyst is deposited on particles such as 2a and 2b, but this embodiment has the advantage of obtaining extremely precise control of the actual amount of catalyst deposited within the electrode. According to this embodiment of the invention, we have found that catalyst-containing material can be caused to dissolve in a mixture of two soluble liquids, the wetting characteristic of which will vary with the concentration of the two liquids. Thus, by appropriate selection of the catalyst-containing compound and the liquids, it is possible to produce a solution of the catalyst-containing material which, during the initial phase of the process, is capable of wetting the hydrophobic portions 3 of the electrode but which upon evaporation will become non-wettable with respect to these hydrophobic portions. The result is that as the solution evaporates, the solution will be driven out of the hydrophobic regions and into the hydrophilic regions where the catalyst-containing solution will contact the electrolyte on the surfaces of the conducting particles 2. The catalyst-containing material will enter into solution in the electrolyte on particles 2 and can be deposited in the same manner as described above by reduction with hot hydrogen.

In order to obtain a solution which will change its wetting characteristics upon evaporation, it is necessary to have a polar component and a relatively non-polar component as the two liquids used to form the solution. The original mixture must have a non-polar component which is more volatile than the polar component, or a concentration on that side of an azeotrope which will cause the concentration of the polar constituent of the solution to increase as evaporation occurs. Naturally, the catalyst-containing compound must be soluble in the polar component and in the solution of the mixture originally chosen. While various materials can be used, we have found that water is the preferred polar component and the lower alcohols are the preferred non-polar components. These materials are miscible in all proportions and the vapor pressures are such that evaporation can be caused to occur at moderate temperatures. While other materials meeting the criteria described above, which are readily determinable by workers skilled in the art, can be used, the following description will be directed to the use of water and alcohol.

When certain liquids are dissolved in each other, there will be a certain composition, which is unique for each set of materials, at which the composition of the vapor phase formed by evaporation of the mixture is identical in composition to that of the liquid phase. This particular composition is known as the azeotropic composition. Any solution of liquids at the azeotropic composition, therefore, cannot be separated by distillation techniques since the composition of the liquid and vapor phases is identical. As an example, assume that the low-boiling azeotropic mixture of liquids A and B is 70% A and 30% B. If a liquid mixture is prepared having a smaller proportion of component A, say 60/40, the vapor phase formed upon evaporation of this liquid mixture will have a higher proportion of component A than the liquid phase. Thus, if the vapor phase is removed and evaporation continued, the concentration of the liquid phase will continuously change and eventually the liquid phase will consist primarily of component B. Similarly, on the other side of a low-boiling azeotrope, if the initial composition was 80% A and 20% B, the vapor phase will have a higher proportion of component B than the liquid phase and if the vapor phase is continuously removed with evaporation continuing, eventually the liquid phase will consist primarily of component A. According to this invention, we have found that solutions of polar and non-polar liquids such as alcohols and water become capable of wetting hydrophobic materials such as PTFE at composition ranges well below the azeotropic composition and on that size of the azeotrope at which evaporation will cause the concentration of the polar liquid in the liquid phase to increase. When the concentration of the polar component reaches a predetermined level, the solution will cease to wet the hydrophobic particles 3 and can be observed to physically withdraw from these hydrophobic regions. However, particles such as 2a, if formed of a mildly hydrophobic material such as graphitized carbon black, will remain wetted with the solution since once wetted the concentration change is not sufficient to restore the hydrophobic character. Thus, according to this embodiment of the invention, the pre-wet electrodes manufactured as described above can be thoroughly flooded in both the hydrophophilic and the hydrophobic areas, by a solution of a catalyst-containing material in the mixed solvents at a concentration at which the solution will wet the hydrophobic regions. When the electrode is subject to heat or vacuum the solution will begin to evaporate, becoming more concentrated in the polar material and, when the concentration is reached at which the liquid solution is no longer capable of wetting the PTFE, the solution will withdraw itself from the hydrophobic regions 3 and mix with the electrolyte within the porous particles 2. Since the catalyst-containing material is in solution in this liquid, virtually all of the catalyst solution is ultimately located in the electrolyte within the conducting particles 2. The catalyst-containing material can then be chemically reacted as described above in order to deposit the metallic platinum. As previously noted, pore "blocking" techniques can be used if desired to prevent the catalyst from entering into the electrolyte in the pores of particles 2.

As an example of a specific preferred system which is usable according to our invention, a solution of isopropyl alcohol in water begins to exhibit wettable characteristics with respect to PTFE when it contains approximately 30 volume percent alcohol. The azeotropic composition, however, is approximately 90 volume percent alcohol, and accordingly, any solution of water and alcohol in which the percentage of alcohol is greater than approximately 30 volume percent and less than approximately 80% will not only be capable of wetting the PTFE but will also be capable of becoming more aqueous as it is subjected to heat. When the percentage of water in the solution exceeds 70%, the solution will become incapable of wetting the PTFE and will withdraw from the hydrophobic regions of the electrode into the hydrophilic regions and into solution in the electrolyte on particles 2. It should be noted, however, that even if the electrode has been prewetted by the technique described above in which particles such as 2a and 2b are not wetted by the electrolyte, some deposition of catalyst on these particles will occur if the catalyzation technique just described is employed. This is because the graphitized particles 2a and 2b, although not hydrophilic with water, are wettable by the alcoholic solution and once they have been so wetted, increasing the concentration of the water does not result in the same change in wetting characteristics as is observed with the PTFE. Thus, this process does result in the deposition of some catalyst in areas where chemical reactions in the electrochemical cell cannot occur. However, this slight disadvantage is substantially overcome by the obvious processing advantages obtained when all of the catalyst-containing solution can be caused to enter into the electrochemical cell electrode in a highly controllable manner with no reprocessing and waste associated therewith.

The above describes the applicants' broad invention in a manner such that any person skilled in the art can practice the same with at most routine experimentation to determine the specific operating parameters for any particular combination of materials. The following examples represent preferred embodiments of the invention and are to be considered as supplementing the above disclosure rather than limiting the same.

EXAMPLE 1

A gaseous diffusion electrode comprising a conductive carbon paper substrate carrying an electrode body of porous graphitized carbon black agglomerates (0.5–5μ), bonded together and to the carbon paper substrate by PTFE particles (0.2μ) was weighed and placed in the apparatus of FIG. 2 with concentrated phosphoric acid (98%) at 70° C and subjected to an anodic potential of approximately 1.2 volts at a current flow of approximately 2 milliamperes per square centimeter for a period of 15 minutes. Upon removal from the prewetting apparatus, the electrode was blotted to remove surface acid and upon visual observation the electrode appeared dry. The electrode was weighed and then treated as described above for another 5 minutes, blotted dry and weighed again. No weight gain was observed, indicating that total prewetting had occurred by the initial treatment. Without anodic treatment, the time required for complete filling varied from 50–500 hours depending on the sample.

EXAMPLE 2

An electrode structure similar to that of Example 1 but using carbon black (non-graphitized) as the conducting particle was treated according to the same process and similar results obtained. The electrode structure appeared dry; however, it was thoroughly wetted by the electrolyte. The anodic preparation obtained total impregnation in 5 minutes whereas without the anodic treatment prewetting by wick action required 0.5 to 3.0 hours for total prewetting depending on the sample.

EXAMPLE 3

A quartz mat was disposed in a tray and thoroughly impregnated with a solution of 25 mg pt/ml solution prepared by mixing chloroplatinic acid in 96% phosphoric acid. The prewet electrode prepared according to Example 1 with the carbon paper substrate on top was laid upon the quartz mat. The rate of diffusion of the chloroplatinic acid into the phosphoric acid electrolyte on the conducting particles is a function of the concentration of the chloroplatinic acid and the temperature of the treatment. At 70° C, the impregnation of the electrode with the catalyst was continued for 5 minutes. The electrode was then removed, the surface of the electrode blotted and the blotter saved for later reprocessing to recover residual platinum. The electrode was then treated with hydrogen gas at 150° C which was passed through the carbon paper substrate into and through the electrode. Chemical reduction of the chloroplatinic acid to metallic platinum occurred and the concentration of platinum in the finished electrode was 0.3 mg/cm$^2$. As prepared the platinum present should be located exclusively on conducting particles which were in electrical-conducting relationship with the substrate and thus capable of participating in the chemical reaction in the electrochemical cell. The electrode was capable of use in an electrochemical cell without the initial start-up period required when the electrochemical cell electrode is not prewetted. Thus, while the electrode appeared dry, it was in fact ready for immediate use rather than having to be impregnated with the electrolyte after assembly into an operating cell.

EXAMPLE 4

Two milliliters of a solution of chloroplatinic acid in a mixture of 80 volume percent isopropyl alcohol and 20% water was placed in a tray having the following dimensions - 3 inches by 3 inches. A prewet electrode fabricated according to Example 1 and having dimensions corresponding to that of the tray was laid on top of the solution of chloroplatinic acid with the carbon paper substrate facing upwards. The solution was substantially completely absorbed in the electrode and upon removal from the tray no noticeable solution remained in the tray. The elctrode was heated at 110° C for 0.25 hour to evaporate the isopropyl alcohol/water mixture. As the concentration of the solution approaches 30% isopropyl alcohol, the solution becomes non-wettable with respect to the hydrophobic PTFE portion of the electrode and the solution should retreat therefrom into the remainder of the electrode structure. After substantially all of the isopropyl alcohol/water solution had been evaporated, the chloroplatinic acid was subject to gaseous reduction in the same manner as Example 3. The finished electrode was placed in operation in a fuel cell and produced cell voltage of 0.620 volt at a current density of 200 ma/cm$^2$ with hydrogen gas fuel and air oxidant at a temperature of approximately 190° C.

While this invention has been disclosed with respect to certain specific embodiments thereof, these embodiments are considered to be illustrative and not limiting of the invention. The invention is usable with materials other than those specifically disclosed herein. It is anticipated that workers skilled in the art will, in fact, utilize other materials, and such use is contemplated within the scope of this invention so long as the general criteria duly set forth above are met with respect to the selection of these various materials. For example, while this invention has been described with respect to an electrode for a phosphoric acid fuel cell, it is equally usable with basic KOH electrolyte fuel cells as well as sulphuric acid fuel cells. Also, materials other than PTFE, graphite, carbon and platinum can be used. Suitable porous conducting particles for electrodes other than carbon and graphite are, for example, boron carbide, tantalum, and nickel, depending on the electrolyte environment. Suitable hydrophobic materials include fluorinated ethylene-propylene and polystyrene, for example, and suitable conducting substrates can be made from metallic screens or resin-bonded carbon plaques depending on the environment. Also, with respect to the catalyst impregnation technique, materials other than alcohol and water can be used. Water, because of its availability and desirable boiling point is, of course, the preferred polar material and similar comments apply also to the alcohol. However, a large number of other organic liquids can obviously also be used. The specific operating parameters for any particular combination of materials is believed readily determinable by workers skilled in the art. Further the technique of increasing the wettability of the conducting particles by means of a D.C. potential can be used alone or in connection with other processes such as the wetting of pre-catalyzed electrodes. Similarly the use of a solution of dissimilar liquids where wettability with different materials varies on evaporation as a carrier to selectively locate a dissolved material in a structure can be used alone or in connection with other processes. Accordingly, this invention is not to be construed as limited by the above disclosure but only by the following claims wherein:

We claim:

1. A process for pre-wetting a conducting particle, hydrophobic bonded, substrate supported, gas diffusion electrochemical cell electrode by causing electrolyte to wet the conducting particles in the hydrophobic-bonded portion of said electrode which comprises:
    (a) exposing the dry conducting particle, hydrophobic-bonded portion of said electrode to said electrolyte while maintaining said substrate substantially unexposed to said electrolyte,
    (b) applying an external electrical potential across the electrode between the substrate and the electrolyte, the potential being of sufficient magnitude to increase the rate at which the electrolyte enters and wets the conducting particle portion of said electrode,
    (c) maintaining said potential for a period of time sufficient to substantially completely wet the conducting particle portion of said electrode, and
    (d) removing said external electrical potential.

2. The process of claim 1 wherein said conducting particles are graphite.

3. The process of claim 2 wherein said electrolyte is phosphoric acid.

4. The process of claim 1 wherein the conducting particles are carbon black.

5. The process of claim 4 wherein said electrolyte is phosphoric acid.

6. The process of claim 1 further comprising the step of using said electrode as an electrode in a gas diffusion electrochemical cell.

7. The process of claim 1 wherein said electrical potential is a positive voltage of 0.9 to 1.6 volts.

8. The process of claim 6 wherein said electrical potential is a positive voltage of 0.9 to 1.6 volts.

9. The process of claim 3 wherein said electrical potential is a positive voltage of between 0.9 and 1.6 volts.

10. The process of claim 5 wherein said electrical potential is a positive voltage of between 0.9 and 1.6 volts.

* * * * *